United States Patent [19]
Klaue

[11] Patent Number: 5,359,855
[45] Date of Patent: Nov. 1, 1994

[54] V-BLOCK TWO-STROKE INTERNAL COMBUSTION ENGINE

[76] Inventor: Hermann Klaue, Case Postale 1344, CH-1820 Montreux, Switzerland

[21] Appl. No.: 105,309

[22] Filed: Aug. 11, 1993

Related U.S. Application Data

[63] Continuation-in-part of Ser. No. 984,893, Dec. 2, 1992, Pat. No. 5,287,701.

Foreign Application Priority Data

Jul. 14, 1992 [DE] Germany .................. 4223393
Jun. 14, 1993 [DE] Germany .................. 4319606

[51] Int. Cl.$^5$ ........................ F02B 33/44
[52] U.S. Cl. ........................ 60/607; 60/624; 123/190.2
[58] Field of Search ............ 60/605.1, 607, 608, 60/624; 123/190.2

[56] References Cited

U.S. PATENT DOCUMENTS

| | | | |
|---|---|---|---|
| 2,570,101 | 10/1951 | Couling | 60/624 |
| 2,625,006 | 1/1953 | Lundquist | 60/607 |
| 2,730,088 | 1/1956 | Hyde. | |
| 2,858,666 | 11/1958 | Fullemann | 60/605.1 |
| 5,148,778 | 9/1992 | Klaue | 123/65 R |

Primary Examiner—Richard E. Gluck
Assistant Examiner—Charles G. Freay
Attorney, Agent, or Firm—Herbert Dubno; Yuri Kateshov

[57] ABSTRACT

An autoignition two-stroke internal combustion engine utilizes rectangular working chambers and pistons with bar-type seals and rotary sleeve valves which connect the working chambers to exhaust gas turbines for secondary expansion and a supercharger. The supercharger is thermally decoupled from the expansion turbines but the expansion turbines are connected to the supercharger and the crankshaft by a planetary gear transmission which can be cut in or out by a disk-type brake or clutch.

7 Claims, 5 Drawing Sheets

V-BLOCK TWO-STROKE INTERNAL COMBUSTION ENGINE

CROSS REFERENCE TO RELATED APPLICATION

This application is a continuation in part of Ser. No. 07/984,893, filed Dec. 2, 1992 and based, in turn, upon German application P 42 23 393.3, filed Jul. 14, 1992, now U.S. Pat. No. 5,287,701 issued Feb. 22, 1994.

FIELD OF THE INVENTION

My present invention relates to a two-stroke internal combustion engine with secondary expansion and supercharging and, in addition, autoignition. More particularly, the invention relates to an autoignition two-stroke internal combustion engine with secondary expansion and supercharging in which there is thermal decoupling between the exhaust gas expansion turbines and the supercharger or turbocompressor (hereinafter "compressor").

BACKGROUND OF THE INVENTION

For reference to an autoignition two-stroke internal combustion engine of the type which utilizes working chambers which have a generally rectangular cross section and pistons which also have a generally rectangular outline and operate with seals which lie in respective planes and are of the rib or bar type, reference may be had to my U.S. Pat. No. 5,148,778 issued Sep. 22, 1992.

In the two-stroke internal combustion engine field, it is known to provide rotary slide valves which serve for material exchange in the system, i.e. admitting fresh air to the working chamber as a combustion-sustaining gas and enabling exhaust gas formed in the combustion, ignition or explosion process to be discharged.

These systems alleviate the disadvantage of fresh-air loss in more conventional three-passage internal combustion engines in which the material exchange is effected exclusively by an appropriate travel to the combustion past passages in the wall of the respective working chamber.

It is also known to provide a two-stroke internal combustion engine with a centrifugal or turbocompressor which supplies the fresh air or fresh gas to flush the working chamber and for supercharging purposes.

It is also known to provide a high efficiency internal combustion engine by providing oscillating pistons in partial cylinders enabling a secondary expansion of the working gasses. In this case, diffusion of exhaust gas into fresh gas is intentionally provided to reduce $NO_x$ release which cannot be readily achievable with two-stroke engines operating with valves.

In four-stroke diesel and autoignition engines, turbo super-charging has been increasingly used in recent years. In this case, turbocompressors driven by exhaust gas are used to increase the filling of the working cylinder with the compressed air or the fuel/air mixture and thus bring about an improvement in power output and fuel efficiency. However, with these systems, there is a thermal coupling of the supercharger and the expansion turbine which requires an expensive supercharging air cooling.

It should also be mentioned that an additional exhaust gas turbine to increase power output has been provided heretofore and is coupled with the crankshaft by a transmission. This contributes to an overall efficiency increase of the engine. With diesel engines or trucks, it is possible to increase the overall efficiency in this manner to say 47%.

Objects of the Invention

It is the principal object of my present invention to improve engine efficiency still further, to say, 50% or more and thereby avoid drawbacks of earlier systems.

More specifically it is an object of the present invention to provide an improved two-stroke internal combustion engine of the autoignition or self-ignition type with secondary expansion and supercharging which will have higher efficiency than could be expected heretofore while nevertheless utilizing a comparatively simple construction.

Another object of the invention is to provide an improved two-stroke engine of the type described which can operate with a reduced carbon oxide emission level and which simultaneously has a significantly reduced engine noise level.

Still another object of the invention is to provide an engine with reduced weight and fabrication cost.

Another object of this invention is to extend the principles of the above-mentioned copending application Ser. No. 07/984,893.

A further object is to provide a light weight, high efficiency two-stroke internal combustion engine with low friction.

SUMMARY OF THE INVENTION

These objects, and others which will become apparent hereinafter, are attained, in accordance with the invention in a two-stroke autoignition internal combustion engine of the secondary expansion and supercharging type which is characterized by the following features originally disclosed in Ser. No. 07/954,893.

a. The working chambers are of rectangular cross section and cooperate with rectangular cross section or outline pistons reciprocatable in the working chambers and provided with bar-type seals lying in respective planes transverse to the direction of reciprocation of the piston;

b. On both sides of the working chambers, hollow rotary slide valves are provided for rotation about respective axes parallel to each other and to the crankshaft axis, one of the rotary slide valves associated with each working chamber being provided to supply fresh gas (e.g. air from the turbocharger) while the second rotary slide valve associated with each working chamber, discharges exhaust gas from the working chamber;

c. The material exchange (fresh gas for exhaust gas) is effected by the cooperation of rotary sleeve valve cutouts or openings and juxtaposed slits in the cylinder block defining the working chambers or the sleeves provided therein; and d. Secondary expansion is effected in one or more gas turbines which are thermally separated from the supercharger or compressor.

More particularly, the engine comprises:

an engine block formed with a plurality of working chambers of generally rectangular cross section configured to operate in an autoignition two-stroke cycle;

respective pistons of generally rectangular cross section reciprocatable in the working chambers upon ignition of a fuel/air mixture in the respective chambers to drive the pistons and producing an exhaust gas in the chambers, the pistons being sealed with respect to the working chambers by planar rib seals;

a crankshaft rotatable in the engine block and coupled with the pistons so as to be rotated by the pistons upon the pistons being driven by the ignition of the fuel/air mixture;

respective rotary slide valves flanking each of the working chambers, rotatable about axes parallel to an axis of the crankshaft and provided for feeding fresh air to and discharging exhaust gas from each working chamber, each of the rotary slide valve having openings cooperating with slits formed in the engine block;

a turbocompressor on the engine block connected with the rotary slide valves feeding fresh air to the cylinders for supercharging the engine;

at least one exhaust gas turbine on the engine block thermally separated from the turbocompressor and connected to at least one of the rotary slide valves discharging exhaust gas so as to be driven by exhaust gas therefrom; and gearing operatively coupling the exhaust gas turbine with the turbocompressor for driving the turbocompressor with the exhaust gas turbine.

According to a feature of the invention disclosed in the earlier application, therefore, the secondary expansion and turbocharging are effected in a manner which insures that they are thermally separate. The coupling of the secondary expansion and the supercharging can be effected through gearing which can be decoupled or deactivated.

During acceleration and hill travel, a higher output is generated with this system, the turbocharging being engaged with secondary expansion, whereas at normal speed, decoupling can be effected allowing the engine to be dimensioned smaller for a particular application and thus allow the engine to be designed to produce less $CO_2$.

In my earlier application, I have described a two-stroke engine whose rectangular piston cross section configuration has substantially reduced friction losses by comparison with cylindrical piston engines and indeed friction losses at the connecting right side which are reduced to a fraction of those of cylindrical piston engines and which provides fresh air and exhaust gas control through rotary sleeve valves without significant dead space between the rotary sleeve valve and the working chamber. Furthermore, the engine of my earlier application provide supercharging at the intake side and exhaust gas secondary expansion whereby the turbine and the supercharger are connectable by a speed changing transmission to the engine crankshaft under the control of a friction device which can be a clutch or brake.

The charger, turbine and speed changing gearing are so dimensioned that a higher engine output can be generated in a free-running state than when the turbine/charging units are connected to the crank shaft. In the coupled condition, a secondary expansion of the piston gases are used to contribute to the engine output whereby the total efficiency of the engine can be increased above 50%. The operating state in which the rotary devices are free-running and at which the fuel consumption is greater than the fuel utilization on secondary expansion, is only utilized under unusual circumstances, for example, to overcome steep slopes which create difficulties at full load or under other full load conditions, under the control of the processor of the engine or by special operator control.

While the aforementioned engine provides extraordinarily effective performance, it has been found to be desirable to reduce the fabrication cost, the engine weight and the effectiveness of the secondary expansion. This can be achieved, in accordance with the invention, by providing the rows of working chambers or with the cylinders in a V-pattern, the exhaust rotary sleeve valves opposite one another also in a V-pattern, the exhaust gas turbine in the engine symmetry axis below the exhaust rotary sleeve valve and the compressor below the exhaust gas turbine in the same symmetry plane and connected therewith via a gear transmission. The fresh air rotary sleeve valves which supply the compressor are provided on the outer sides of the V-block engine.

More particularly, the two-stroke internal combustion engine of the present invention, utilizing the principles and the construction of the earlier application unless otherwise indicated, can comprise:

an engine block of V pattern formed with a plurality of working chambers of generally rectangular cross section configured to operate in an autoignition two-stroke cycle, said working chambers being elongated and diverging upwardly symmetrically in said V pattern with respect to a vertical symmetry plane between chambers on opposite sides of the engine block;

respective pistons of generally rectangular cross section reciprocatable in the working chambers upon ignition of a fuel/air mixture in the respective chambers to drive the pistons and produce an exhaust gas in the chambers, said pistons being sealed with respect to the working chambers by planar rib seals;

a crankshaft rotatable in the engine block about an axis in said plane and coupled with said pistons so as to be rotated by the pistons upon the pistons being driven by said ignition of the fuel/air mixture;

respective exhaust rotary slide valves disposed on opposite sides of the symmetry plane in the V pattern between the chambers on opposite sides of the block and communicating with the chambers, rotatable about axes parallel to an axis of the crankshaft and discharging exhaust gas from each working chamber;

respective intake rotary slide valves disposed adjacent the chambers on opposite outer sides of the block, rotatable about respective axes parallel to the crankshaft axis and feeding air to the chambers, each of the rotary sleeve valves having openings cooperating with slits formed in the engine block;

a turbocompressor on the engine block having an axis in the symmetry plane and disposed below the exhaust rotary sleeve valves, the turbocompressor being connected with the intake rotary sleeve valves feeding fresh air to the chambers for supercharging the engine;

at least one exhaust gas turbine on the engine block having an axis in the symmetry plane and disposed above the turbocompressor and below the exhaust rotary sleeve valves and connected to at least one of the exhaust rotary sleeve valves so as to be driven by exhaust gas therefrom; and gearing operatively coupling the exhaust gas turbine with the turbocompressor for driving the turbocompressor with the exhaust gas turbine.

The gearing between the turbo compressor and the exhaust gas turbine can be a planetary transmission having a friction device, e.g. a brake or clutch for activating same. The planetary transmission, of course, can be coupled to the crankshaft as well. When a simple gearing transmission is provided between the exhaust gas turbine and the compressor, the system is so constructed that when the gearing is inactive at an operating speed of the engine, a supercharging pressure of the compressor is generated which is greater than that produced with the gearing in the active state.

BRIEF DESCRIPTION OF THE DRAWING

In the drawing described below, an example of a four-cylinder engine is provided with counter-reciprocating pistons and which can be used as the engine for a 40 ton traction load, for example a 40 ton truck.

The above and other objects, features and advantages of the present invention will become more readily apparent from the following description, reference being made to the accompanying drawing in which:

FIG. 3 is a timing diagram for the engine of FIGS. 1 and 2;

SPECIFIC DESCRIPTION

Figure 1:
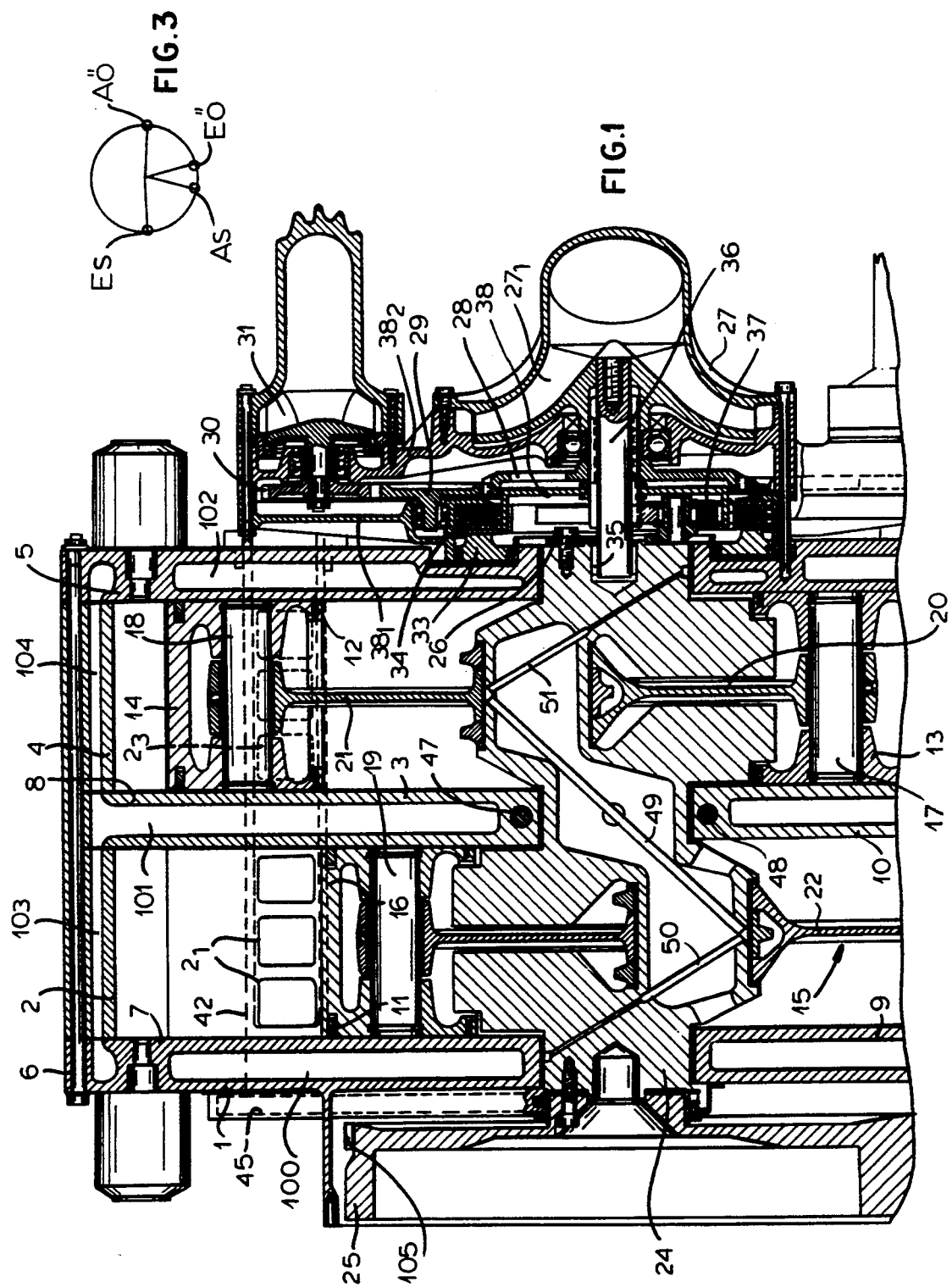
FIG. 1 is a partial cross sectional view through a portion of an engine according to the invention taken along the line I—I of FIG. 2.
Figure 2:
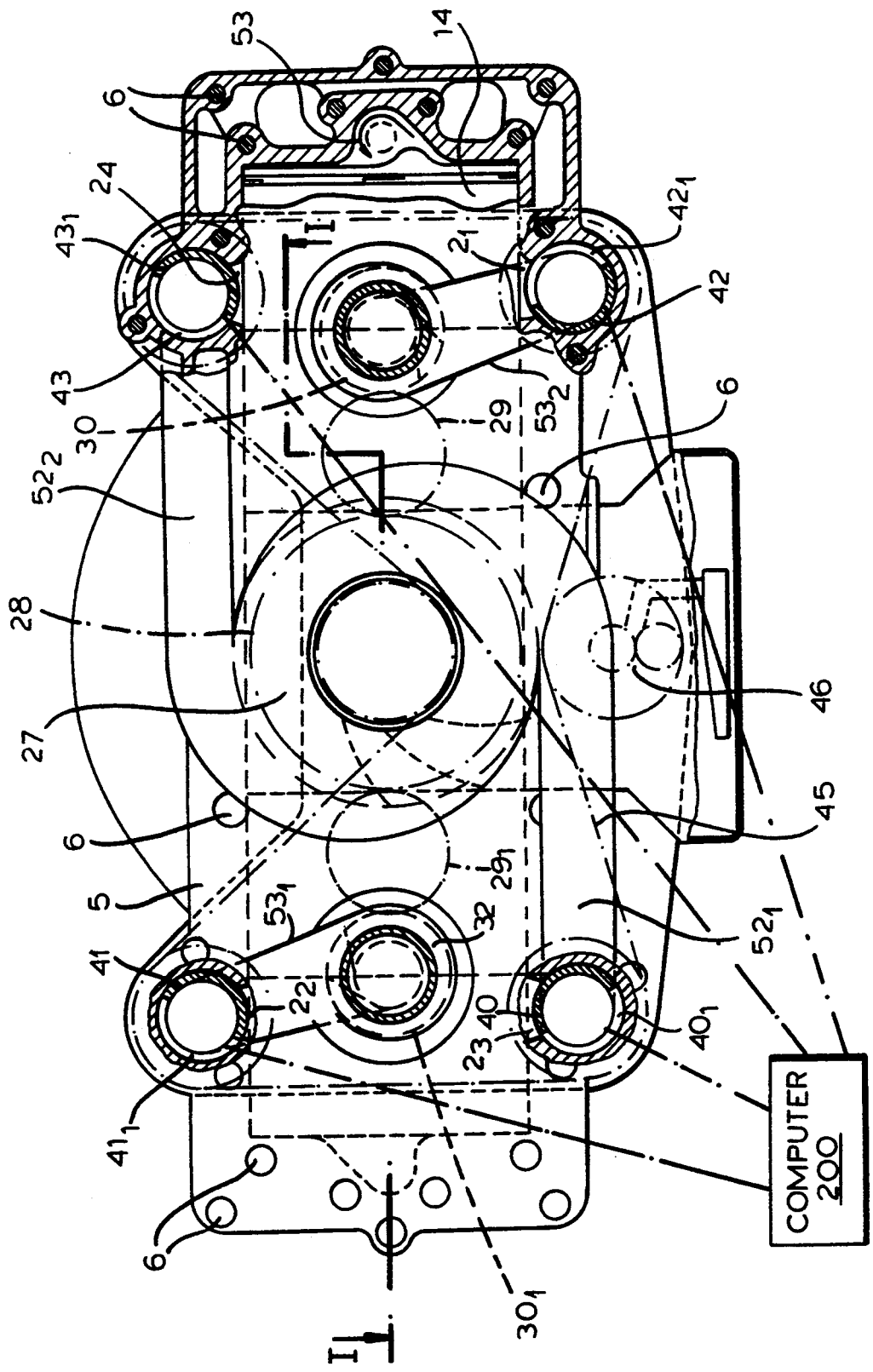
FIG. 2 is an end view of the engine of FIG. 1 seen from the right hand side thereof, but partially broken away in various regions.

In FIGS. 1–3 of the drawing, I have shown an engine in which the block is assembled by drawbolts 6 from grey cast-iron cylinder block parts 1–5 which are cast hollow so as to form cooling water passages as represented generally at 100, 101, 102, 103, 104 in FIG. 1.

The cylinder block parts or slabs 1–5 define working chambers 7–10 which are of rectangular cross section (see the aforementioned patent) and receive rectangular outline pistons 13–16 which are reciprocatable in these working chambers and are sealed relative to the walls of the working chambers by bar-type seals as represented at 11 and 12. The bar-type seal around the periphery of a respective piston lies in a common plane, e.g. a plane perpendicular to the plane of the paper in FIG. 1.

The pistons 13–16 are connected by pins 17, 18, 19 and connecting rods 20–23 with a crankshaft.

The pistons transfer the explosion or combustion force to the cast crankshaft 24 which is formed with a flywheel 25 and a gear 105 which can drive a pinion (not shown) forming the output to a transmission of the truck. The crankshaft 24 also has a planet carrier 26 attached thereto and forming one element of a planetary transmission which can be cut in or out and which serves to drive the supercharging compressor 27 which is connected by the gears 28–30 ($29_1$, $30_1$) with the exhaust gas turbines 31 and 32. These gears can form part of the planetary transmission described.

An annular piston 33 which can respond to the engine oil pressure, can act upon a lamella disk brake 34 juxtaposed with the planetary transmission and serving to cut the planetary transmission in or out.

The shaft 36 is journaled relative to the crankshaft in a roller bearing 35 and carries the impeller $27_1$ of the supercharger and is keyed to the gear 28 meshing with planet gear 29 on housing part 38. The planet carrier 26 has planet wheels 37 meshing with external gearing on shaft 36 and with internal gearing of a bell 38 rotating on the shaft 36 and carrying the rotary plates of the disk brake 34. The stationary plates of the brake 34 are on bell 38.

If the brake 34 is actuated from the engine or transmission microprocessor through an appropriate valve, not shown, with the engine oil pressure, the planetary transmission can effect a connection to the supercharger via the gears 28–30, $29_1$, $30_1$ from the exhaust gas turbine 31, 32 in the flanged housing $38_1$, $38_2$. The supercharger-exhaust-gas turbine transmission is so constructed that, in this operating state, the excess power of the exhaust-gas turbines is fed to the crankshaft and thus the engine output, and the supercharging is so dimensioned that the engine operates at optimum efficiency.

When the brake 34 is not actuated, as will be apparent from FIG. 1, the turbine 31, driven by the exhaust gas, rotates gear 30 to drive the gear 29 and then gear 28 which is keyed to the shaft and thus rotates the turbine $27_1$ of the compressor 27. The gear 37 on the planet carrier 26 freewheels, as does the bell 38 which carries the rotatable plates of the brake 34. The power of the exhaust gas turbine, therefore, serves only to drive the supercharger.

The engine material exchange is effected with the pattern illustrated in FIG. 3 utilizing the openings 40–43 in the four rotary slide valves and cooperating with the slits $2_1$, $2_2$, $2_3$, $2_4$ in the walls of the working chambers 7–10 which provide a large time cross section. The Figure shows at $A_o$ and $A_s$ the opening and closing of the outlets and at $E_o$ and $E_s$ the opening and closing of the inlets.

The diagonally opposite rotary slide valves 40 and 43 receive compressed air via the ducts $52_1$ and $52_2$ from the supercharger 27. The rotary slide valves 41 and 42 with their oppositely oriented outlets feed through the short ducts $53_1$ and $53_2$ the gas turbines 31 and 32 with exhaust gas. Thus a symmetrical charging of the four working chambers operating in the two-stroke cycle is ensured.

In the embodiments shown, the rotary slide valves are driven from the crankshaft by a roller chain 45 (forming the timing chain) which also drives oil pump 46. The oil pump is mounted in a bearing bracket which is fastened by the anchor 47, 48 to the central block member 3. Lubrication of the crankshaft bearings is here effected through tubes 49–51 pressed into the cast crankshaft.

In addition to the advantages described, the two-stroke engine has the advantage of minimal $NO_x$ release because of the flushing effected through the rotary sleeve valve. Since there is no cylinder head provided with valves in this system, the combustion chamber can have the fuel injected via the nozzles 24 shortly before the upper center positions are reached by the pistons and thus can employ high pressure injection from nozzles controlled by the process.

The gearing can have a transmission ratio between input and output sides such that the exhaust gas turbine, the compressor and gearing, with the gearing inactive at an operating speed of the engine, generate a supercharging pressure of the compressor which is greater than that produced with the gearing being active.

In FIG. 2, moreover, I show at 100 a computer operatively connected to the rotary sleeve valves for controlling engine time in dependence upon engine speed and load.

Soot formation is excluded because the hot cylinder walls ensure an intensive cylindrical vortex of the fuel particles as indicated at 53 in FIG. 2.

Figure 4:
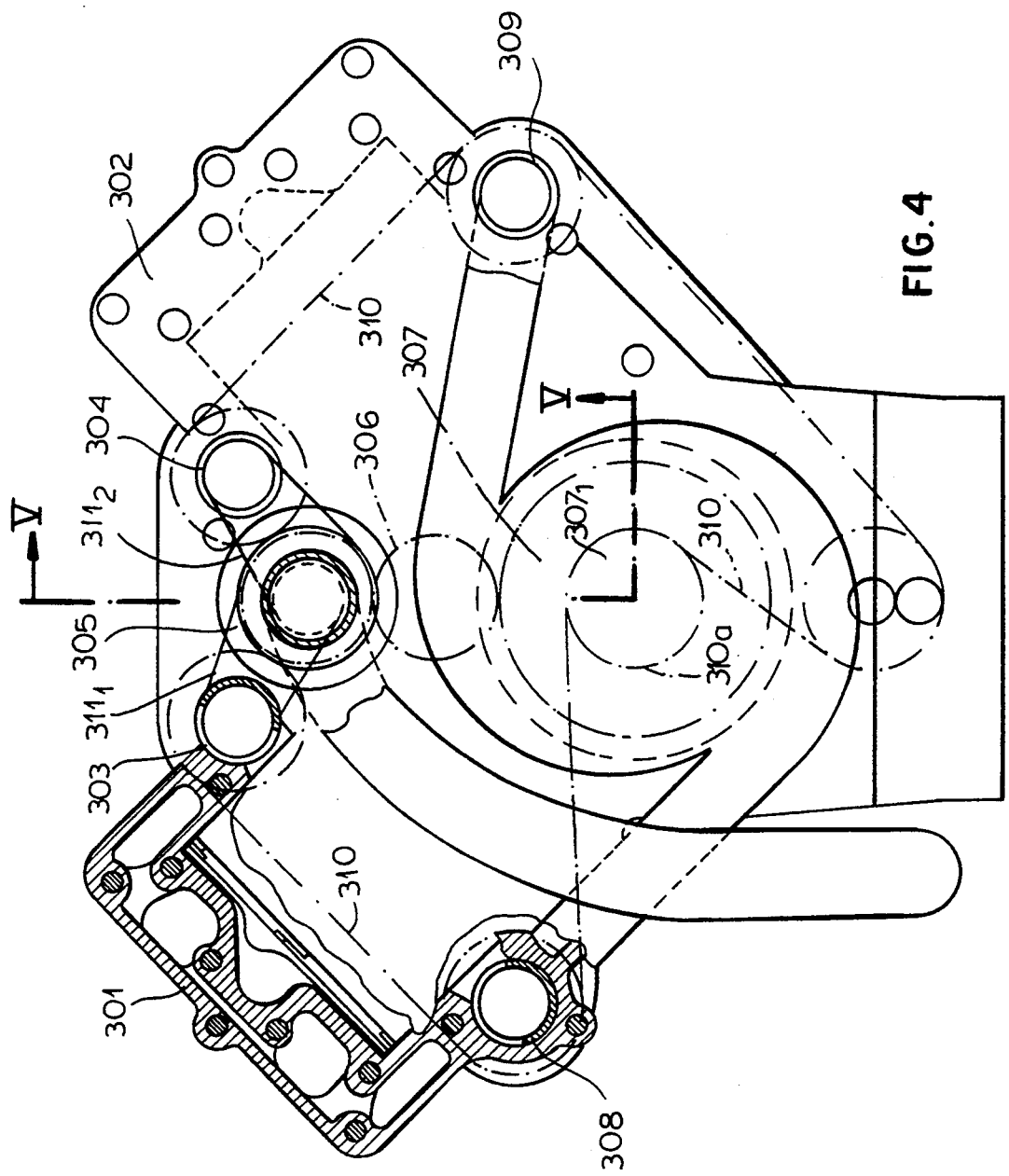
FIG. 4 is an end view of a V-block engine according to the present invention, partly broken away.
Figure 5:
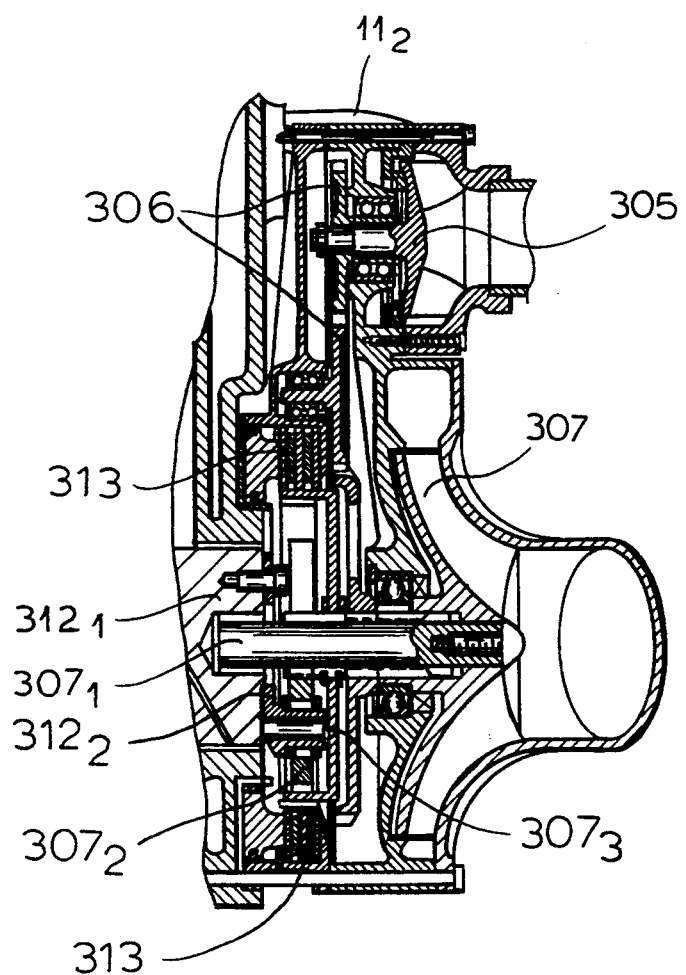
FIG. 5 is a cross sectional view taken along line V—V of FIG. 4, i.e. along the vertical symmetry plane thereof.
Figure 6:
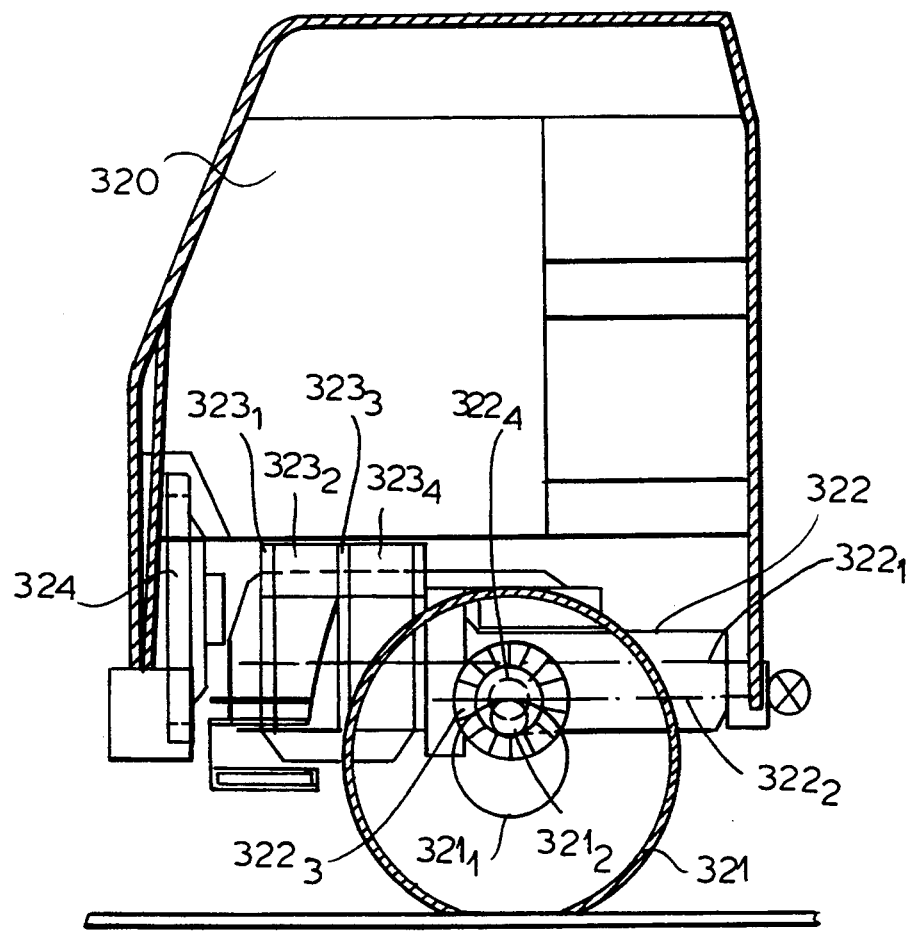
FIG. 6 is a diagram showing the engine built into a tractor or cab portion of a four-cylinder 300 horsepower truck having the ability to pull a 40 metric ton load.

In FIGS. 4–6, I have shown at 301, 302, the two rows of working chambers formed in a V-pattern block with rotary sleeve valves 303, 304 serving as the exhaust valves and at the rear of the engine by a chain 310 to the crankshaft pinion 310a. The chain is also connected to the fresh air intake rotary slide valves 308, and 309 which are located along the outer sides of the engine block.

The exhaust gas from the rotary slide valves 303 and 304 is fed through the ducts $311_1$ and $311_2$ to the exhaust gas turbine 305 in which the flow energy of the exhaust gas is converted into rotary mechanical energy contributing to the output of the crankshaft.

The gear train 306 connects the turbine 305 with the shaft $307_1$ of the charger of compressor 307. The shaft $307_1$ (FIG. 5) is driven via three planet gears $307_2$ of a planet carrier $307_3$ freely rotatable on the shaft $307_1$.

In the transfer of the secondary expansion energy transformed by the turbine 5 into rotary mechanical energy to the crankshaft, as described in the embodiment of FIGS. 1–3, brake 313 is actuated to brake relative rotation of the sets of disks half of which are connected to the planet carrier $307_3$ and the other half of which are on the engine housing, thereby transferring the torque from turbine 305 via the planet gears $307_2$ to members $312_2$ on the crankshaft $312_1$ with a corresponding transmission ratio. The planet gearing has a transmission ratio such that when fuel gas is applied to the engine, a charger speed is generated ensuring a 10% to at most 15% contribution from the charger to the engine output and as contributed by the turbine.

The maximum engine output with secondary expansion transfer of energy to the crankshaft is at fuel consumption which is of the order of magnitude of 10% less than the consumption for operation with free-running rotary devices so that for all normal operating states at fuel load, the fuel efficiency of the engine is assured.

In FIG. 6 I have shown the application of this engine to a four-wheel drive of a tractor of a 40-ton tractor-trailer truck utilizing the two-stroke engine of the invention in combination with wheel-drive transmission. The wheels also are provided with disk brakes. In this Figure, the driver's cab is shown at 320 and the left front wheel at 321 which has on its hub an internally-toothed bellwheel $321_1$ engaging the pinion $321_2$. The latter is driven by a 12-speed automatic transmission 322 with a driven shaft $322_1$ and a drive shaft $322_2$. The disk brake $322_3$ is coaxial with the drive linkage $322_4$.

The engine is assembled from five disk-shaped gray cast iron parts $323_1$–$323_5$ to form a four-wheel V block engine operating in an autoignition or diesel mode with rectangular section carbon pistons.

Its stroke volume is 7400 cm³ and calculations show that it will provide, with free-running charger 380 kW at 1900 rpm. At 1400 rpm the engine utilizes 190 g/kWh of diesel fuel. With coupled charging, at an engine output of 340 kW at 1900 rpm and as a result of secondary expansion at 1400 rpm, 175 g/kWh of fuel is consumed. Not counting the cooling unit 324 at the front engine, the engine weights 750 kg.

I claim:

1. An autoignition two-stroke internal combustion engine, comprising:

an engine block of V pattern formed with a plurality of working chambers of generally rectangular cross section configured to operate in an autoignition two-stroke cycle, said working chambers being elongated and diverging upwardly symmetrically in said V pattern with respect to a vertical symmetry plane between chambers on opposite sides of the engine block;

respective pistons of generally rectangular cross section reciprocatable in said working chambers upon ignition of a fuel/air mixture in the respective chambers to drive said pistons and produce an exhaust gas in said chambers, said pistons being sealed with respect to said working chambers by planar rib seals;

a crankshaft rotatable in said engine block about an axis in said plane and coupled with said pistons so as to be rotated by said pistons upon said pistons being driven by said ignition of said fuel/air mixture;

respective exhaust rotary sleeve valves disposed on opposite sides of said symmetry plane in said V pattern between said chambers on opposite sides of said block and communicating with said chambers, rotatable about axes parallel to an axis of said crankshaft and discharging exhaust gas from each working chamber;

respective intake rotary sleeve valves disposed adjacent said chambers on opposite outer sides of said block, rotatable about respective axes parallel to said crankshaft axis and feeding air to said chambers, each of said rotary sleeve valves having openings cooperating with slits formed in said engine block;

a turbocompressor on said engine block having an axis in said symmetry plane and disposed below said exhaust rotary sleeve valves, said turbocompressor being connected with the intake rotary sleeve valves feeding fresh air to said chambers for supercharging the engine;

at least one exhaust gas turbine on said engine block having an axis in said symmetry plane and disposed above said turbocompressor and below said exhaust rotary sleeve valves and connected to at least one of the exhaust rotary sleeve valves so as to be driven by exhaust gas therefrom; and gearing operatively coupling said exhaust gas turbine with said turbocompressor for driving said turbocompressor with said exhaust gas turbine and Operatively coupling said exhaust gas turbine with said crankshaft; and a friction device for selectively activating and inactivating said gearing respectively in actuated and deactivated positions of the friction device, said turbine being coupled with said crankshaft in said actuated position of said friction device and being decoupled from said crankshaft in said deactivated position of said friction device.

2. The engine defined in claim 1 wherein said gearing is a planetary transmission provided between said turbocompressor and said crankshaft.

3. The engine defined in claim 2 wherein said friction device is a brake.

4. The engine defined in claim 2 wherein said friction device is a clutch.

5. The engine defined in claim 1 wherein a supercharging pressure of said turbocompressor is generated in said deactivated position of said friction device corresponding to engine at an operating speed, said turbine being with decoupled from said crankshaft at said operating speed, said supercharging pressure being greater than a supercharging pressure produced with said gearing being active in said actuated position of said friction device and corresponding to said turbine driving said crankshaft upon using the engine under an increased load condition.

6. The engine defined in claim 1 wherein said rotary sleeve valves are driven by gear wheels or chains from said crankshaft.

7. The engine defined in claim 1, further comprising a computer operatively connected to said rotary sleeve valves for controlling engine timing in dependence upon engine load and speed.

* * * * *